United States Patent
Cassel et al.

(10) Patent No.: US 7,055,223 B2
(45) Date of Patent: Jun. 6, 2006

(54) BAND CLAMP WITH REACTION MEMBER

(75) Inventors: Scott T. Cassel, Bloomfield Hills, MI (US); Michael E. Amedure, Lake Orion, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 10/795,038

(22) Filed: Mar. 5, 2004

(65) Prior Publication Data

US 2004/0261227 A1 Dec. 30, 2004

Related U.S. Application Data

(60) Provisional application No. 60/452,404, filed on Mar. 6, 2003.

(51) Int. Cl.
 *F16B 33/00* (2006.01)
(52) U.S. Cl. .................. 24/20 R; 24/21; 24/23 R
(58) Field of Classification Search .............. 24/274 R, 24/278, 274 WB, 19, 280–282, 305, 495, 24/271, 279; 285/114, 410, 419; 248/65, 248/70, 74.1–74.3
See application file for complete search history.

(56) References Cited

U.S. PATENT DOCUMENTS

| | | | |
|---|---|---|---|
| 978,398 A * | 12/1910 | Rischard | 24/339 |
| 1,096,503 A * | 5/1914 | Gibbs | 24/279 |
| 1,479,317 A * | 1/1924 | Peirce | 24/275 |
| 1,524,074 A * | 1/1925 | Wolcott | 24/280 |
| 1,584,498 A * | 5/1926 | Vitek | 24/281 |
| 2,335,464 A * | 11/1943 | Tinnerman | 24/275 |
| 3,361,403 A * | 1/1968 | Oeler | 248/205.1 |
| 4,261,600 A | 4/1981 | Cassel | |
| 4,312,526 A | 1/1982 | Cassel | |
| 4,364,588 A * | 12/1982 | Thompson | 285/419 |
| 5,131,698 A | 7/1992 | Calmettes et al. | |
| 6,269,524 B1 * | 8/2001 | Cassel | 24/279 |

* cited by examiner

*Primary Examiner*—Robert J. Sandy
*Assistant Examiner*—Ruth C. Rodriguez
(74) *Attorney, Agent, or Firm*—Reising, Ethington, Barnes, Kisselle, P.C.

(57) ABSTRACT

A band clamp comprising a sleeve and a tightening mechanism that includes at least one fastener, such as a nut and bolt, as well as a reaction member which is constructed of a single piece of sheet metal. The reaction member is disposed between the end flanges of the clamp sleeve and can be shaped such that it is forcibly pressed into engagement with the underlying pipe when the clamp is tightened. The reaction member can be a separate component retained between the flanges by engagement of end portions of the reaction member with retainer ears on the flanges. Alternatively, the end flanges and reaction member can all be unitary portions of the clamp sleeve such that the complete band clamp, except for the bolt and nut, is comprised of a unitary piece of sheet metal.

20 Claims, 3 Drawing Sheets

BAND CLAMP WITH REACTION MEMBER

CROSS-REFERENCE TO RELATED APPLICATION

This application claims the priority of U.S. Provisional Patent Application No. 60/452,404, filed Mar. 6, 2003, the entire contents of which are hereby incorporated by reference.

FIELD OF THE INVENTION

This invention relates to band clamps and more particularly, it relates to band clamps for pipes and hoses.

BACKGROUND OF THE INVENTION

In the manufacture of vehicles such as cars, trucks, motorcycles, snowmobiles and the like, band clamps are commonly used for joining pipe ends together in the engine exhaust system. Also, band clamps are commonly used for joining hoses, such as hydraulic hoses, to hose fittings. In these applications, it can be important for the pipe joints to provide a good fluid seal to prevent leakage. It can also be important for the joint to exhibit a high degree of mechanical strength for withstanding road shock and vibration without loosening and without impairment of the sealing properties of the pipe joint. Band clamps for such vehicle exhaust systems are commonly used for making both lap joints, with the pipe ends overlapping each other, or butt joints, with the pipe ends abutting each other. In such applications, the clamp tightening mechanism must be capable of exerting a stretching force on the clamp sleeve so that it produces a radially-directed compressive force between engaging surfaces of the band and the underlying pipe ends whereby the pipe joint may exhibit good mechanical strength and sealing properties.

Band clamps are already known in the prior art which have the capabilities described above. Such clamps are exemplified by Cassel et al. U.S. Pat. No. 4,629,226 granted Dec. 16, 1986 and Cassel U.S. Pat. No. 4,312,526 granted Jan. 26, 1982, and the entire contents of these two patents are hereby incorporated by reference. Apart from these two Cassel patents, the Thompson U.S. Pat. No. 4,364,588, granted Dec. 21, 1982 and Calmettes et al. U.S. Pat. No. 5,131,698, granted Jul. 21, 1992, disclose band clamp designs using alternative reaction member designs. While the clamps of the aforementioned patents may be suitable for their intended applications, it is desirable to provide a band clamp having a clamp tightening mechanism which can be manufactured in high volume at lower cost than at least some of these prior art designs.

SUMMARY OF THE INVENTION

In accordance with this invention, a band clamp is provided with a clamp band, or sleeve, and with a tightening mechanism which is capable of exerting a large stretching force on the clamp sleeve and which can be manufactured in high volume at low cost. The tightening mechanism includes at least one fastener, such as a nut and bolt, as well as a reaction member which is constructed of a single piece of sheet metal. The reaction member is disposed between the end flanges of the clamp sleeve and can be shaped such that it is forcibly pressed into engagement with the underlying pipe when the clamp is tightened. The end flanges and reaction member can be unitary portions of the clamp sleeve such that the complete band clamp, except for the bolt and nut, is comprised of a unitary piece of sheet metal.

A complete understanding of this invention may be obtained from the detailed description that follows taken with the accompanying drawings.

DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
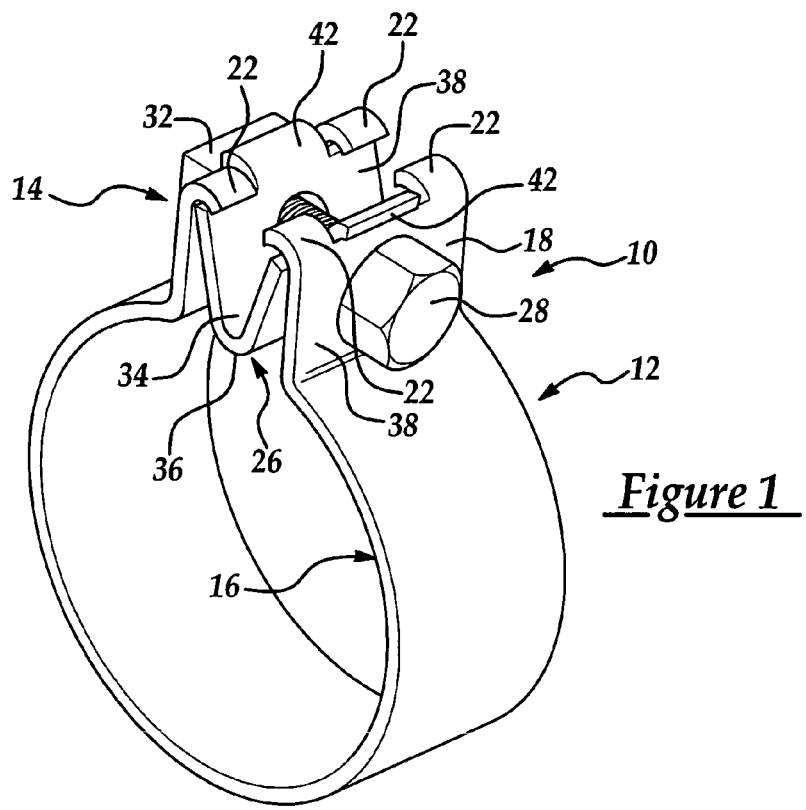
FIG. 1 is a perspective view of a first embodiment of the band clamp of this invention.

Referring now to the drawings, the invention is shown in three different embodiments of a band clamp especially adapted for use in coupling pipe ends together to form a pipe joint in vehicle exhaust systems. In exhaust system applications, the band clamp is preferably made of steel. In the illustrative embodiments of the invention, the invention is implemented in a band clamp with a single bolt in the tightening mechanism in the manner shown in the above-cited Cassel et al. U.S. Pat. No. 4,629,226. The invention can also be implemented with a tightening mechanism having two bolts as disclosed in the above-cited Cassel U.S. Pat. No. 4,312,526. It will be appreciated as the description proceeds, that the invention is useful in many different applications and may be implemented in many other embodiments.

In the drawings, the band clamp of this invention is shown in its un-installed condition in readiness for placement over ends of two pipes (not shown) which are to be coupled together by the band clamp to make a pipe joint. In this usage, the band clamp constitutes a pipe coupling for making a pipe joint. The band clamp of this invention is of the open sleeve type with a roundish sector which terminates in oppositely disposed end flanges which define a radially extending sector, as disclosed in the aforementioned Cassel U.S. Pat. No. 4,312,526. The two pipes which are to be coupled together may be of substantially the same diameter and disposed within the band clamp with opposed ends in abutting relation to form a butt joint. For use in a butt joint, the clamp sleeve is preferably of uniform diameter. Alternatively, the two pipes may have different diameters at the adjoining ends with one inside the other in a telescoping relation to form a lap joint. For a lap joint, the clamp sleeve may be preformed in the roundish sector to provide end bands of different diameters to accommodate the different outside diameters of the pipes. The clamp sleeve may be preformed by the method disclosed in Cassel U.S. Pat. No. 4,261,600 granted Apr. 14, 1981.

First Embodiment of this Invention

Figure 2:
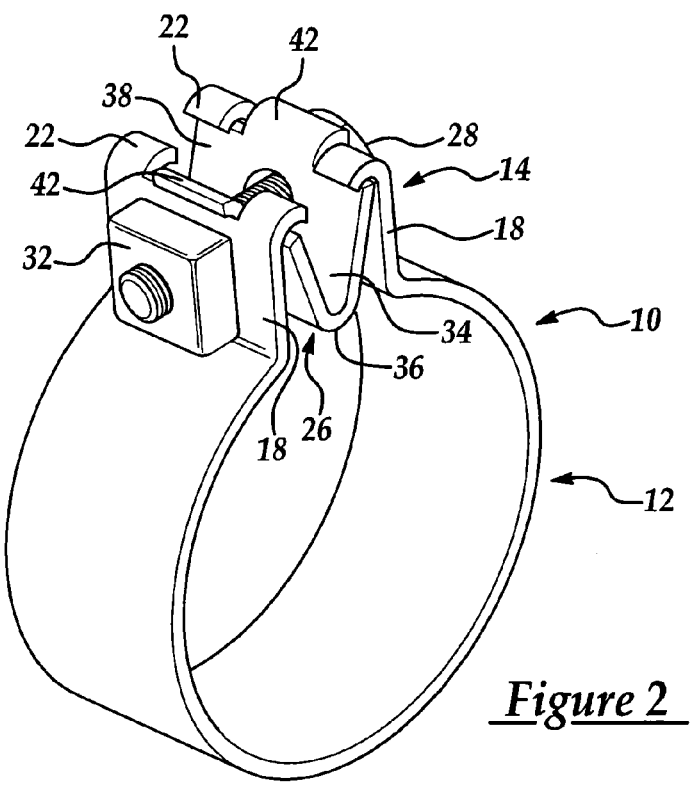
FIG. 2 is another perspective view of the first embodiment of the band clamp of this invention.

The first embodiment of the invention will be described with reference to FIGS. 1, 2 and 3. The band clamp 10 comprises, in general, a clamp band 12 and a clamp tightening mechanism 14. A clamp sleeve 16 is formed as a roundish-shaped sector and has open ends terminating in radially-extending end flanges 18 which comprise part of the clamp tightening mechanism 14. The clamp band 12 and clamp tightening mechanism 14 will be described in detail below.

The clamp band 12 comprises an open sleeve 16 of roundish-shape which terminates in opposite end flanges 18 which extend radially from the sleeve and are unitary therewith. As mentioned above, the end flanges comprise parts of the clamp tightening mechanism. As can be seen in FIG. 3, the sleeve can be opened to place the clamp sleeve around the pipe ends for either a lap joint or a butt joint. Each end flange 18 terminates at its outer end in a pair of circumferentially extending, spaced-apart retainer ears 22 which extend toward the other end flange. On each end flange, the pair of retainer ears define a keeper notch 24 therebetween.

The clamp tightening mechanism 14 comprises the pair of end flanges 18, a reaction member 26, a bolt 28 and a nut 32. The reaction member has a V-shaped body 34 with a rounded base 36 and outwardly extending legs 38 each having transversely extending hanger ears 42 directed away from each other. The hanger ears 42 are disposed in respective notches 24 to support the reaction member 26 between the end flanges 18 with the inner extremity of the base 36 of the body 34 located at the inside diameter of the sleeve 16. The end flanges 18 and the legs 38 of the reaction member 26 are provided with aligned bolt holes 44 for receiving the shank of the bolt 28 with the bolt head seated on the outside surface of one end flange 18 and the nut 32 seated against the outside surface of the other end flange 18.

Figure 3:
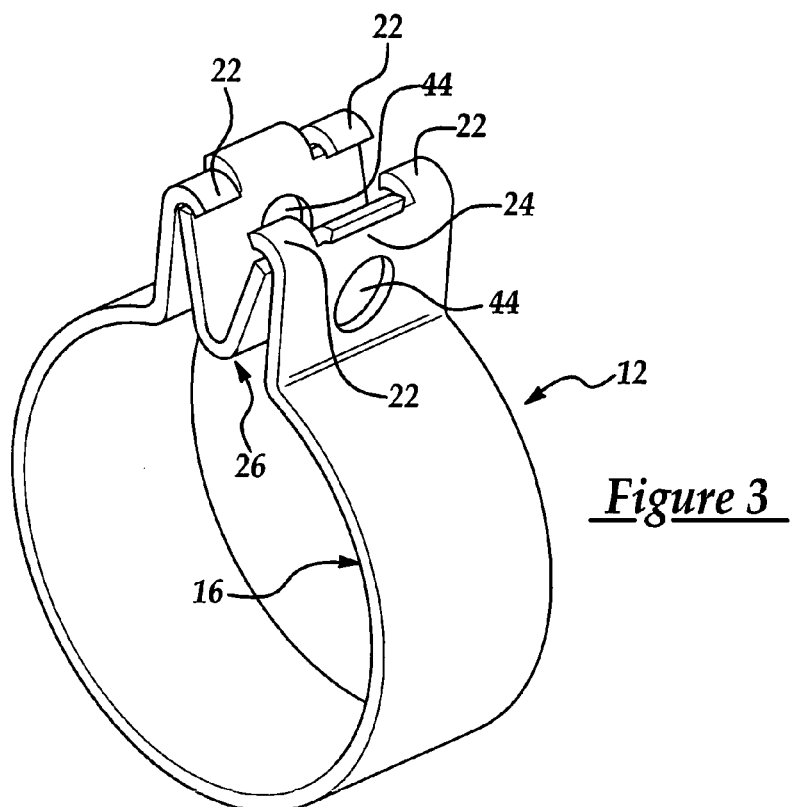
FIG. 3 is another perspective view of the first embodiment without the bolt and nut.

Before the band clamp 10 is installed, the parts may be loosely assembled as shown in FIG. 3 or the parts may be unassembled. In some applications, the pipe ends may be inserted axially into the band clamp in its loosely assembled state. In other applications where the pipe ends are already telescoped together or abutted with each other, it will be necessary to pass the open clamp sleeve laterally over the pipes and then assemble the clamp parts. With the loosely assembled band clamp 10 in place, the nut 32 is tightened on the bolt 28 to stretch the clamp sleeve 12 around the pipes. As the nut is tightened, the end flanges 18 are drawn toward each other and the V-shaped reaction member 34 is progressively deformed to a narrower width. Also during tightening, the end flanges 18 are pulled inwardly and the retainer ears 22 force the base 36 of the reaction member inwardly toward a central region of the band 12 and into engagement with the outer surface of the adjacent pipe. At some point during tightening, the sleeve 16 of the clamp band 12 and the base of the reaction member 26 are snugly seated against the pipe but, at that point, only a small tensile stress is developed in the sleeve. In order to achieve a high degree of mechanical strength (pull-apart strength) and a good gas-tight seal in the pipe joint, it is necessary to tighten the nut sufficiently to stretch the sleeve 16 so as to develop the desired degree of tensile stress. Accordingly, the clamp tightening mechanism 14, including the end flanges 18 and reaction member 26 must exhibit sufficient structural strength to transmit the necessary forces from the bolt 28 to the sleeve 16. The V-shaped structure of the body 34 of the reaction member 26 provides leverage with good mechanical advantage for transmitting the forces for stretching the sleeve 16. Further, the V-shaped structure has the advantage of requiring a minimum amount of material for the reaction member 26 and can be fabricated from sheet steel by a stamping operation. This component will transfer clamp load under the fastening mechanism to provide a 360 degree seal and prevent wrinkling of the pipe under the fastening mechanism, which will prevent leakage. It is desirable to use a large area bolt head and a large area nut, preferably with a diameter or rectangular dimension substantially as large as the radial length of the end flanges 18 to minimize the bending stresses in the end flanges. Thus the structural configuration of the clamp tightening mechanism 14 is highly advantageous in that it can provide a large value of tensile stress in the sleeve 16 with the end flanges and the reaction member being made of relatively thin steel.

Second Embodiment of the Invention

Figure 4:
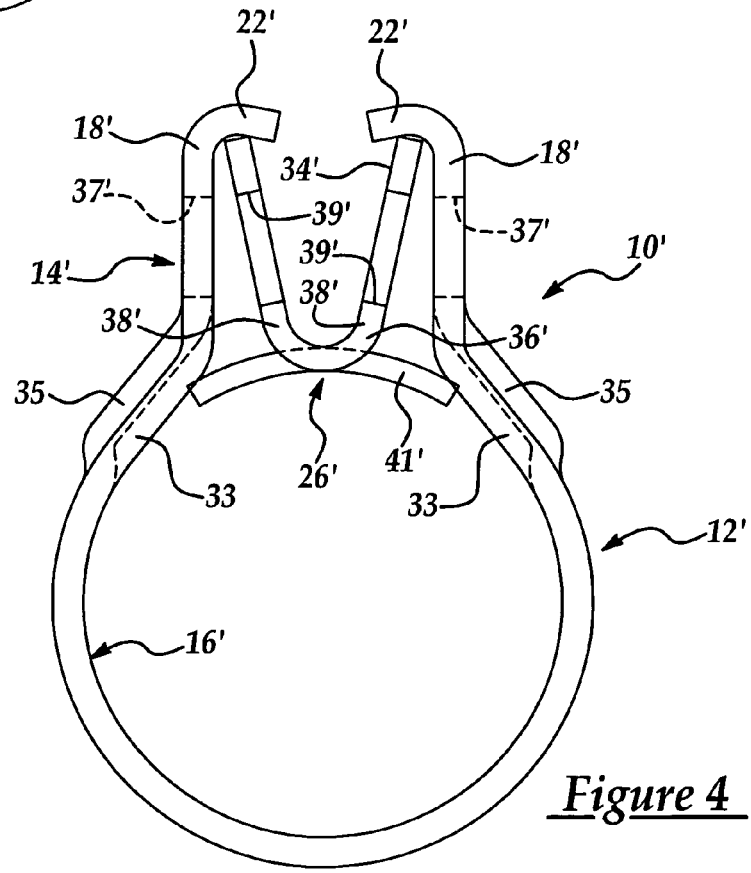
FIG. 4 is an end elevation view of a second embodiment of the band clamp of this invention.

The second embodiment of the invention is shown in FIG. 4. The band clamp 10' of this embodiment has a clamp tightening mechanism 14' which is of different structure from that of the first embodiment. In the description of the second embodiment, those parts which are similar to but not identical to corresponding parts of the first embodiment are designated by the same reference numbers but with the addition of a prime symbol, e.g. 10'.

Referring now to FIG. 4, the clamp tightening mechanism 14' comprises a pair of end flanges 18', a reaction member 26' and, like the first embodiment, a bolt and nut (not shown). Each end flange 18' terminates at its outer end in a retainer ear 22' which is coextensive with the width of the end flange. Two spaced-apart reinforcing ribs 35 (only one shown) are formed in each end flange 18'. Each rib extends circumferentially between the sleeve 16' and the lower end of the end flange 18'. The ribs 35 are stamped into the sheet steel and form respective channel-shaped recesses 33 in the interior surface. Each end flange 18' defines a bolt hole 37' on the same centerline as the bolt hole in the other end flange.

The reaction member has a V-shaped body 34' including a rounded base 36' with outwardly extending legs 38' each of which terminates in a straight upper end. Each of the legs 38' defines a bolt hole 39' which is larger than the bolt holes in the end flanges 18' for accommodating the change in angularity of the legs 38' with the tightening of the clamp. When the outer ends of the legs 38' are in engagement with the retainer ears 22', as shown, the centerlines of the bolt holes 39' are spaced from the retainer ears 22' by the same distance as the bolt holes 37'. The reaction member 26' also comprises a pair of arcuate support plates 41' (only one shown) each of which is unitary with the V-shaped body 34'. The support plates 41' are located at opposite ends of the V-shaped body and are suitably stamped out of the body between the bolt holes 39' and the ends of the body. Each support plate 41' is located in alignment with one pair of reinforcing ribs 35 and has its ends nested in the channel-shaped recess 33. The arcuate support plates 41' have a curvature substantially the same as the sleeve 16' and are adapted to seat against the outer surface of the adjacent pipe when the clamp is tightened. The support plates 41' serve to increase the strength of the pipe joint and to improve the sealing capability of the joint.

The band clamp 10' is used in the same manner as band clamp 10 of the first embodiment described above.

The Third Embodiment of the Invention

The third embodiment of the invention will be described with reference to FIGS. 5 and 6. The band clamp 10" of this embodiment has a clamp tightening mechanism 14" which, except for the bolt and nut, is unitary with the sleeve 16". In the description of the third embodiment, those parts which are similar to but not identical to corresponding parts of the second embodiment are designated by the same reference numbers but with the addition of a double prime symbol, e.g. 10".

Figure 5:
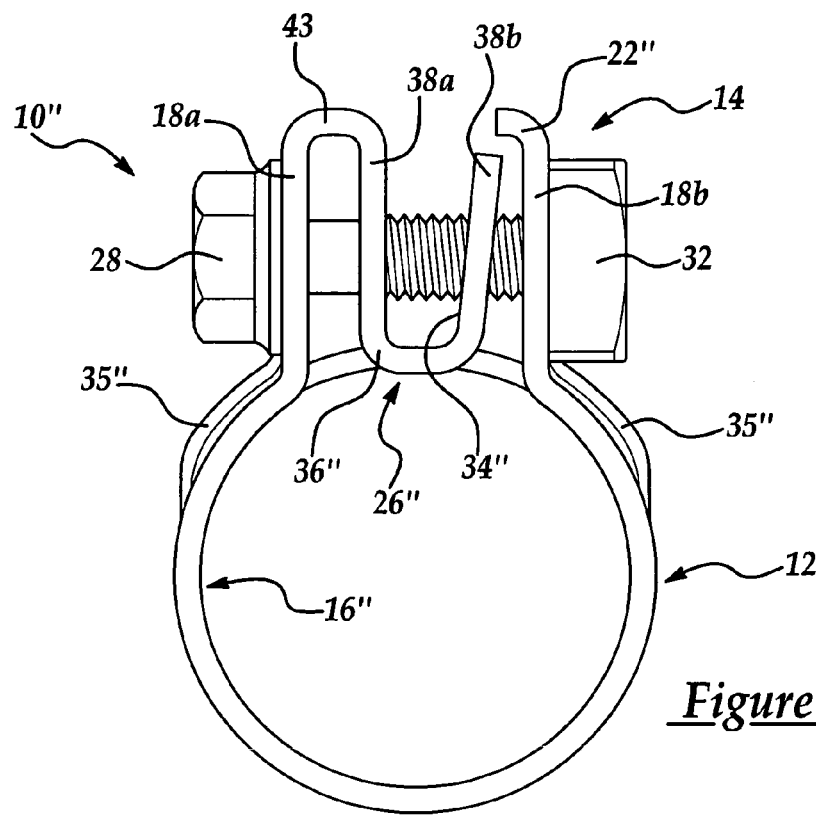
FIG. 5 is an end elevation view of a third embodiment of the band clamp of this invention.
Figure 6:
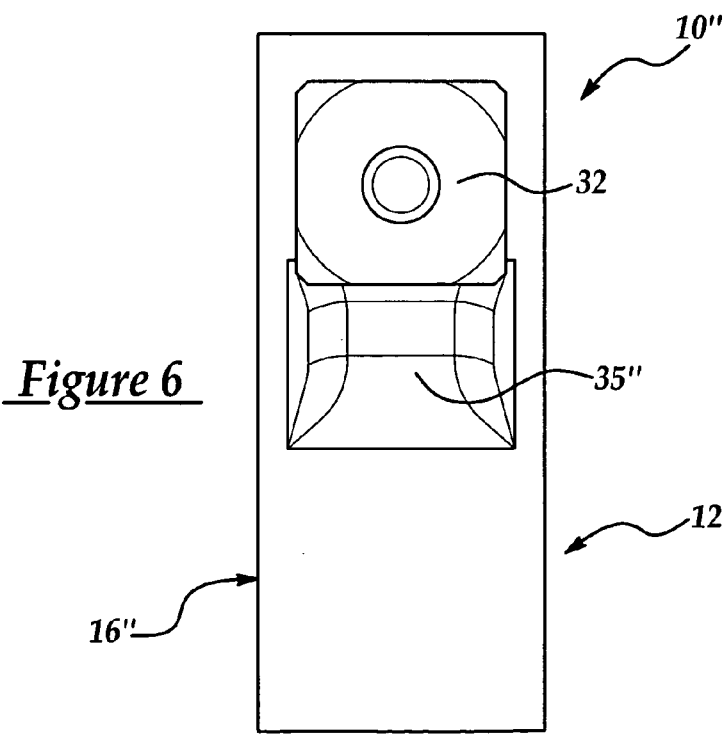
FIG. 6 is a side elevation view of this band clamp of FIG. 5.

Referring now to FIGS. 5 and 6, the clamp tightening mechanism 14" comprises a pair of end flanges 18*a* and 18*b*, a reaction member 26", and like the first embodiment, a bolt 28 and nut 32. The difference between this embodiment and the second embodiment is that the V-shaped reaction member 26", which comprises a rounded base 36" and legs 38*a* and 38*b*, is unitary with the clamp sleeve 16". The flange 18*b* terminates in a retainer ear 22". It is noted that the leg 38*a* of the V-shaped reaction member 26" is joined with the end flange 18*a* by a bight 43 which is unitary with the leg 38*a* and the end flange 18*a*. Thus, the entire band clamp 10", except for the bolt and nut, is made of one piece of sheet metal.

The band clamp 10" is used in the same manner as the band clamp 10 of the first embodiment described above.

It will thus be apparent that there has been provided in accordance with the present invention a band clamp which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, the reaction member of the embodiment of FIGS. 1–3 could be implemented as a unitary extension of one of the end flanges, rather than as a separate component. All such variations and modifications are intended to come within the scope of the appended claims.

As used in this specification and appended claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A band clamp, comprising:
   a band that extends from a first end to a second end; and
   a tightening mechanism located at said first and second ends and including a first end flange, a second end flange, and a reaction member, wherein said first and second end flanges are formed at said first and second ends, respectively, and said reaction member lies between said flanges and is v-shaped with first and second extending legs;
   whereby, during tightening said first and second end flanges are drawn toward each other and said first and second extending legs are also drawn toward each other.

2. The band clamp of claim 1, wherein said tightening mechanism further comprises a bolt and a nut, and wherein said bolt extends through holes in said flanges and reaction member and ends at said nut.

3. The band clamp of claim 1, wherein said band is a round sleeve and said first and second end flanges extend radially from said band and are unitary therewith.

4. A band clamp, comprising:
   a band that extends from a first end to a second end; and
   a tightening mechanism located at said first and second ends and including a first end flange, a second end flange, and a reaction member, wherein said first and second end flanges are formed at said first and second ends, respectively, and said reaction member lies between said flanges and is v-shaped with first and second extending legs;
   whereby, during tightening said first and second end flanges are drawn toward each other and said first and second extending legs are also drawn toward each other;
   wherein each, of said first and second end flanges terminate in a pair of retainer ears spaced-apart to define a keeper notch therebetween.

5. The bend clamp of claim 4, wherein each of said first and second extending legs have a hanger ear formed in an end of said leg, said hanger ears extend transversely away from each other and are each disposed in one of said keeper notches.

6. The band clamp of claim 1, wherein said first and second extending legs intersect at a base of the reaction member, and wherein said first and second flanges each engage an upper end of said first and second legs, respectively, such that said base moves radially inwardly toward a central region of the clamp during tightening of the tightening mechanism.

7. A band clamp, comprising:
   a band that extends from a first end to a second end; and
   a tightening mechanism located at said first and second ends and including a first end flange, a second end flange, and a reaction member, wherein maid first and second end flanges are formed at said first and second ends, respectively, and said reaction member lies between said flanges and is v-shaped with first and second extending legs;
   whereby, during tightening said first and second end flanges are drawn toward each other and said first and second extending legs are also drawn toward each other;
   wherein each of said first and second end flanges have a rib formed therein that extends from the lower end of each flange and onto respective first and second ends of said band.

8. The band clamp of claim 7, wherein said reaction member further has a support plate for each rib, said support plate being located at an intersection of said first and second extending legs and being aligned with said ribs.

9. The band clamp of claim 8, wherein each of said first and second end flanges have a retainer ear formed on their outer ends.

10. The band clamp of claim 8, wherein said first extending leg of said reaction member is unitary with said first end flange and wherein said second end flange has a retainer ear formed on its outer end.

11. A band clamp, comprising:
    a band that includes a roundish sleeve having a central region;
    a tightening mechanism that is partly formed from said sleeve, comprising:
       a first end flange and a second end flange that both generally extend radially from said sleeve;

a reaction member that lies between said first and second end flanges, wherein said reaction member includes a base and first and second extending legs, said extending legs being joined at said base and extending divergently from said base and from the other extending leg to outer ends of said flanges; and a fastener;

wherein, when the band clamp is tightened using said fastener, said reaction member is deformed to a narrower width and said base moves inwardly toward a central region of said band.

12. The band clamp of claim 11, wherein said fastener comprises a bolt and a nut, and wherein said bolt extends through holes in said flanges and reaction member and ends at said nut.

13. The band clamp of claim 11, wherein each of said first and second end flanges terminate in a pair of retainer ears spaced-apart to define a keeper notch therebetween.

14. The band clamp of claim 13, wherein each of said first and second extending legs have a hanger ear formed in an end of said leg, said hanger ears extend transversely away from each other and are each disposed in one of said keeper notches.

15. A band clamp, comprising:

a band that includes a roundish sleeve having a central resign:

a tightening mechanism that is partly formed from said sleeve, comprising:

a first end flange and a second end flange that both generally extend radially from said sleeve; and a reaction member that lies between said first and second end flanges, wherein said reaction member is v-shaped with a base that joins first and second extending legs;

whereby, when the band damn is tightened, said reaction member is deformed to a narrower width and said base moves inwardly toward a central region of said band;

wherein each of said first and second end flanges have a rib formed therein that extends from the lower end of each flange and onto said sleeve.

16. The band clamp of claim 15, wherein each of said ribs form a recess in the interior surface of said sleeve.

17. The band clamp of claim 16, wherein said reaction member further has a support plate for each formed recess, said support plate i) extends from said base, ii) Is aligned with said respective recess, and iii) is adapted to complement the shape of said recess.

18. The band clamp of claim 17, wherein each of said first and second end flanges have a retainer ear formed on their outer ends.

19. The band clamp of claim 17, wherein said first extending leg of said reaction member is unitary with said first end flange and wherein said second end flange has a retainer ear formed on its outer end.

20. A band clamp comprising:

a band having a roundish sleeve terminating in first and second open ends; and a tightening mechanism located at said open ends and comprising:

a first end flange that extends radially from said first open end and is unitary therewith;

a second end flange that extends radially from said second open end and is unitary therewith;

a reaction member generally located between said end flanges, said reaction member comprising a base and unitary first and second legs, wherein said first leg extends radially outwardly from said base to an outer end of said first end flange and said second leg extends radially outwardly from said base from the first leg has been to an outer end of said second end flange; and a fastener that extends through holes formed in said tightening mechanism;

wherein said extending legs connect to said end flanges only at the outer ends of said end flanges such that, during tightening of the band clamp using said fastener, said first and second end flanges are drawn towards each other, thereby forcing said legs towards each other with said base moving inwardly toward a central region of said sleeve.

* * * * *

UNITED STATES PATENT AND TRADEMARK OFFICE
CERTIFICATE OF CORRECTION

| | |
|---|---|
| PATENT NO. | : 7,055,223 B2 |
| APPLICATION NO. | : 10/795038 |
| DATED | : June 6, 2006 |
| INVENTOR(S) | : Cassel et al. |

It is certified that error appears in the above-identified patent and that said Letters Patent is hereby corrected as shown below:

Col. 6, In claim 7, line 36, after "wherein" delete "maid" and insert -- said --.

Col. 7, In Claim 15, line 26, after "central" delete "resign:" and insert --region;--.

Col. 7, In Claim 15, line 35, after "band" delete "damn" and insert --clamp--.

Col. 8, In Claim 17, line 3, after "ii)" delete "Is" and insert -- is--.

Signed and Sealed this

Thirteenth Day of March, 2007

JON W. DUDAS
*Director of the United States Patent and Trademark Office*